United States Patent
Wang et al.

(10) Patent No.: US 7,895,145 B2
(45) Date of Patent: Feb. 22, 2011

(54) METHOD, SYSTEM AND DEVICE FOR CONTROLLING POLICY INFORMATION REQUIRED BY A REQUESTED SERVICE

(75) Inventors: Xu Wang, Shenzhen (CN); Jin Zhang, Shenzhen (CN)

(73) Assignee: Huawei Technologies Co., Ltd., Shenzhen (CN)

(*) Notice: Subject to any disclaimer, the term of this patent is extended or adjusted under 35 U.S.C. 154(b) by 582 days.

(21) Appl. No.: 11/830,952

(22) Filed: Jul. 31, 2007

(65) Prior Publication Data

US 2008/0052258 A1 Feb. 28, 2008

(30) Foreign Application Priority Data

Jul. 31, 2006 (CN) .................. 2006 1 0099152

(51) Int. Cl.
*G06N 5/00* (2006.01)
(52) U.S. Cl. .......................... 706/46; 706/45
(58) Field of Classification Search .............. 706/45, 706/46
See application file for complete search history.

(56) References Cited

U.S. PATENT DOCUMENTS

| 6,839,338 B1 | 1/2005 | Amara et al. | |
| 7,184,765 B1 * | 2/2007 | Birnie et al. | 455/432.3 |

FOREIGN PATENT DOCUMENTS

| CN | 1553741 A | 12/2004 |
| CN | 1764184 | 4/2006 |
| CN | 1988722 | 6/2007 |
| WO | 03/49348 | 6/2003 |
| WO | WO03/047162 | 6/2003 |
| WO | WO03/058886 | 7/2003 |
| WO | WO2006/059931 | 6/2006 |

OTHER PUBLICATIONS

N. Olaziregi, Z. Boufidis, and E. Mohyeldin, "Management and Control Architecture of Reconfigurable Systems", WWRF Working Group 6 White Paper, Nov. 2005, pp. 1-31.*
3GPP: $3^{rd}$ Generation Partnership Project; Technical Specification Group Core Network and Terminals; Policy and Charging Control signaling flows and QoS parameter mapping; (Release 7)—3GPP TS 29.213 VO. 1.0, May 2006, XP002466684.
3GPP: $3^{rd}$ Generation Partnership Project; Technical Specification Group Services and System Aspects; Policy and charging control architecture (Release 7)-3GPP TS 23.203 V1.0.0, May 2006, XP002466685.

(Continued)

*Primary Examiner*—Wilbert L Starks, Jr.
(74) *Attorney, Agent, or Firm*—Finnegan, Henderson, Farabow, Garrett & Dunner LLP

(57) ABSTRACT

A method for controlling policy information required by a requested service includes: obtaining a second decision result of a second network on policy information required by a requested service; making decision on the policy information required by the requested service according to a first policy information in the first network and the second decision result; and generating a final decision result on the policy information required by the requested service. A device and a system for controlling policy information required by a requested service are further disclosed. If different networks have different related policies, solutions provided by the present invention may provide a process for controlling policy information required by a requested service.

18 Claims, 3 Drawing Sheets

OTHER PUBLICATIONS

European Search Report 07113550.3-2413 mailed Feb. 11, 2008.
First Chinese Office Action dated (mailed) Nov. 9, 2007, issued in related Chinese Application No. 200610099152.7, Huawei Technologies Co., Ltd.

Written Opinion of the International Searching Authority (translation) dated (mailed) Jul. 26, 2007, issued in related Application No. PCT/CN2007/001216, filed Apr. 13, 2007, Huawei Technologies co., Ltd.

* cited by examiner

US 7,895,145 B2

METHOD, SYSTEM AND DEVICE FOR CONTROLLING POLICY INFORMATION REQUIRED BY A REQUESTED SERVICE

This application claims the benefit of Chinese Application No. 200610099152.7 filed on Jul. 31, 2006, titled "METHOD AND SYSTEM FOR NEGOTIATING POLICY INFORMATION BETWEEN DIFFERENT NETWORKS", which is incorporated by reference herein in its entirety.

FIELD OF THE INVENTION

The present invention relates to the field of communication, in particular, to a method, a system and a device for controlling policy information required by a requested service.

BACKGROUND OF THE INVENTION

When a terminal performs a data service, a network needs to control policy information of the data service, so that services with corresponding QoS (Quality of Service) may be performed for different data services. In the next generation SAE (System Architecture Evolution) network, decision may be made on the policy information required by a data service requested by a terminal via a PCRF (Policy Control and Charging Rules Function). FIG. 1 shows an architecture of an SAE network based on non-roaming scenario, including: a UE (User Equipment) (such as a mobile phone), which functions as a terminal; IMS (IP Multimedia Subsystem) 14; AF (Application Function) 13, which functions as a service server; PCRF 12; RAN (Radio Access Network) 11; and MME (Mobility Management Entity)/UPE (User Plane Entity)/IASA (Inter AS Anchor), and so on.

The IASA is used for connecting an external data network, such as an IMS. The UPE is used between RAN 11 and IASA, for establishing a data connection for the UE and transferring data. The MME is used for managing location information of a user plane device in RAN. The PCRF 12 obtains, from AF 13, the data service information requested by a UE, and makes decision on the policy information required by the data service (for example, QoS and charging rules required by the data service), then delivers the decision result to MME/UPE/IASA, and policy information such as related charge may also be preconfigured on PCRF 12, so that the MME/UPE/IASA may initiatively request PCRF 12 to deliver the policy information.

When a terminal wants to perform a data service on the SAE network, the terminal first accesses the network via RAN 11, then establishes a connection with the IASA via MME/UPE, and then establishes a connection between RAN 11 and IMS 14 via MME/UPE and the IASA. The terminal sends a service request to IMS 14 to inform IMS 14 of the requested service, IMS 14 informs PCRF 12 of the service information required by the terminal via AF 13, and PCRF 12 determines which policy information is needed by the service, and delivers the policy information to the MME/UPE/IASA; and then the MME/UPE/IASA executes the policy information.

The case, in which the network controls the policy information of a data service when the terminal requests the data service in local home network, has been described above. The case, in which the network controls the policy information of the data service after the terminal roams to a VPLMN (Visited PLMN), will be introduced.

FIG. 2 shows architecture of an SAE network in roaming scenario, which includes a VPLMN and an HPLMN (Home PLMN), and the HPLMN refers to the operator network to which a user subscribes. The VPLMN includes vPCRF (Visited Policy Control and Charging Rules Function) 21 and MME/UPE/vIASA 24; the HPLMN includes IMS 26, AF 27, hPCRF (Home Policy and Charging Enforcement Function) 22 and hIASA (Home Inter AS Anchor) 25.

When a terminal roams to a visited network and wants to carry out a data service, the terminal visits via the VPLMN and establishes a connection with hIASA 25 in the HPLMN via MME/UPE/vIASA 24 in the VPLMN, and establishes a connection with IMS 26 via hIASA 25. When the connection is established successfully, the terminal sends a request data service to IMS 26, and IMS 26 sends the service data requested by the terminal to hPCRF 22 via AF 27. The hPCRF 22 decides which policy information should be allocated to the service data, and then delivers the decision result to vPCRF 21 initiatively, or waits for vPCRF 21 to acquire the decision result. Finally, vPCRF 21 transparently transmits the obtained decision result to MME/UPE/vIASA 24, and the MME/UPE/vIASA 24 executes the policy information of the decision result.

The inventor finds that there exist at least the following problems in the prior art: the conventional method for controlling policy information required by a service via the network is only applicable for the case in which some policy information of the VPLMN operator is not configured in vPCRF 21, or the case in which some policy information of the VPLMN operator is configured in vPCRF 21 and the policy information is same as corresponding policy obtained by vPCRF 21 from hPCRF 22. For the case in which some policy information of the VPLMN operator is configured in vPCRF 21 and the policy information is different from the corresponding policy obtained by vPCRF 21 from hPCRF 22 or the corresponding policy delivered to vPCRF 21 by hPCRF 22 initiatively, no related processing method exists at present.

SUMMARY OF THE INVENTION

Embodiments of the present invention provide a method, a device and a system for controlling policy information required by a requested service; and specific processes for controlling policy information required by a requested service via the network in the case when different networks have different corresponding policies are provided.

An embodiment of the present invention provides a method for controlling policy information required by a requested service, including: obtaining a second decision result of a second network on policy information required by a requested service; and making a decision on the policy information required by the requested service according to a first policy information in a first network and the second decision result, and generating a final decision result on the policy information required by the requested service.

An embodiment of the present invention further provides a device for controlling policy information required by a requested service, including: a communication unit, adapted to obtain a second decision result of a second network on policy information required by a requested service; and a decision-making unit, adapted to make decision on the policy information required by the requested service according to the first policy information in the first network and the second decision result provided by the communication unit, and generate a final decision result on the policy information required by the requested service.

An embodiment of the present invention further provides a system for controlling policy information required by a requested service, including: a second function entity in a second network, adapted to generate a second decision result of the second network on the policy information required by the requested service; and a first function entity in a first network, adapted to make decision on the requested service according to the internal first policy information and the second decision result provided by the second function entity, and obtain the final decision result on the requested service.

It can be seen from the above technical solutions according to embodiments of the present invention, the second decision result of the second network on policy information required by a requested service is obtained firstly, and then decision is made according to the first policy information in the first network and the second decision result, thus the final decision result on the policy information required by the requested service is further obtained. Therefore, in the embodiments of the present invention, the policy information required by a service may be controlled depending on different requirements of different network operators for the same requested service. Thus, according to embodiments of the present invention, a feasible solution may be provided for a case in which some policy information of the VPLMN operator is configured in the vPCRF and the policy information is different from the corresponding policy obtained by the vPCRF from the hPCRF.

DETAILED DESCRIPTION OF THE EMBODIMENTS

The first embodiment of the present invention provides a method for controlling policy information required by a requested service, wherein: when a terminal accesses via a first network and needs to visit a service of a second network (or a service of the first network) and no policy information is preconfigured in the PCRF of the second network, a PCRF in the first network will make a decision again according to internal policy information and the decision result of the second network on the policy information required by the service requested by a terminal, thus the final decision result on the policy information required by the service requested by the terminal will be obtained. Those skilled in the art may appreciate that when a terminal requests a service to the network, the service may be regarded as a requested service at the network. Therefore, when the network controls the policy information required by a service requested by the terminal, it may be regarded that the network controls the policy information required by the requested service. In this embodiment, the requested service is a service requested by a terminal in roaming state, the first network is the visited network of the terminal, and the second network is the home network of the terminal.

Figure 3:
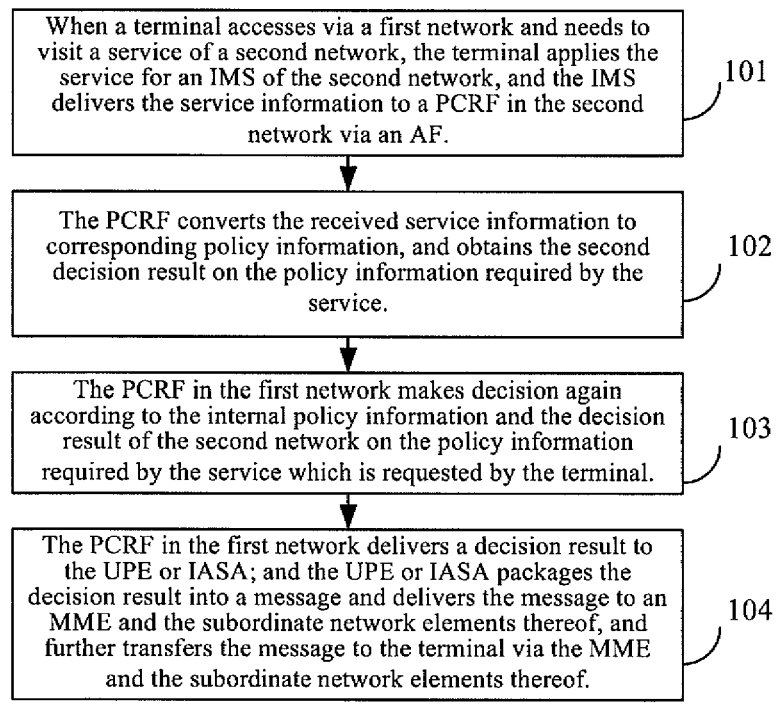
FIG. 3 is a flow chart of an embodiment of the present invention.

The process of the first embodiment is shown in FIG. 3, including:

Block 101: when a terminal accesses via the first network and needs to visit a service of the second network, the terminal applies for the service to an IMS of the second network, and the IMS delivers the service information to a PCRF in the second network via an AF;

Block 102: the PCRF in the second network converts the received service information into corresponding policy information, and obtains the second decision result on the policy information required by the service; and Block 103: the PCRF in the first network makes decision again according to the first policy information and the second decision result of the second network on the policy information required by the service requested by the terminal, and thus the final decision result is obtained.

Specifically, there are two ways for the PCRF in the first network to obtain the second decision result of the second network on the policy information required by the service requested by the terminal.

The first way is: the PCRF in the second network initiatively delivers the decision result to the PCRF in the first network, and the PCRF in the first network obtains the second decision result of the PCRF in the second network on the policy information required by the service according to the information delivered by the PCRF in the second network.

The second way is: the PCRF in the first network requests the PCRF in the second network to deliver the decision result, and the PCRF in the first network acquires the decision result of the PCRF in the second network on the policy information required by the service according to the information delivered by the PCRF in the second network.

After the PCRF in the first network acquires the second decision result of the second network on the policy information required by the service requested by the terminal, the PCRF makes decision on the policy information required by the service requested by the terminal again according to the internal policy information and the acquired second decision result, and obtains the final decision result on the policy information required by the service requested by the terminal. The specific process at least includes three situations as follows.

Situation 1: the PCRF in the first network ignores the internal policy information, completely inherits the second decision result acquired from the PCRF in the second network, and takes the second decision result as the final decision result on the policy information required by the service requested by the terminal. This situation occurs when the second network has absolute control power on the service of a terminal and the operator of the first network also accepts the agreement.

Situation 2: the PCRF in the first network ignores the decision result acquired from the PCRF in the second network, makes decision on the policy information required by the service requested by the terminal only according to the first policy information, and obtains the corresponding final decision result. This situation occurs when the first network has control power on the service of the terminal and the operator of the second network accepts the agreement.

Situation 3: the PCRF in the first network compares the second decision result acquired from the PCRF in the second network with the first policy information configured internally, and takes the intersection of the second decision result and the first policy information as the decision result. This situation occurs when some agreements are made between the operators of the two networks and the operation features of the two networks are considered synthetically.

After the above processing, the PCRF in the first network makes final decision on the policy information of the service requested by the terminal according to the acquired second decision result of the PCRF in the second network together with the first policy information, and then performs the following steps.

Block 104: the PCRF in the first network delivers the decision result to the UPE or IASA, the UPE or IASA packages the decision result into a message and delivers the message to an MME and subordinate network elements, and further transfers the message to the terminal via the MME and the subordinate network elements.

The above policy information includes corresponding QoS information of the service, or may include stream-based charging information.

Figure 1:
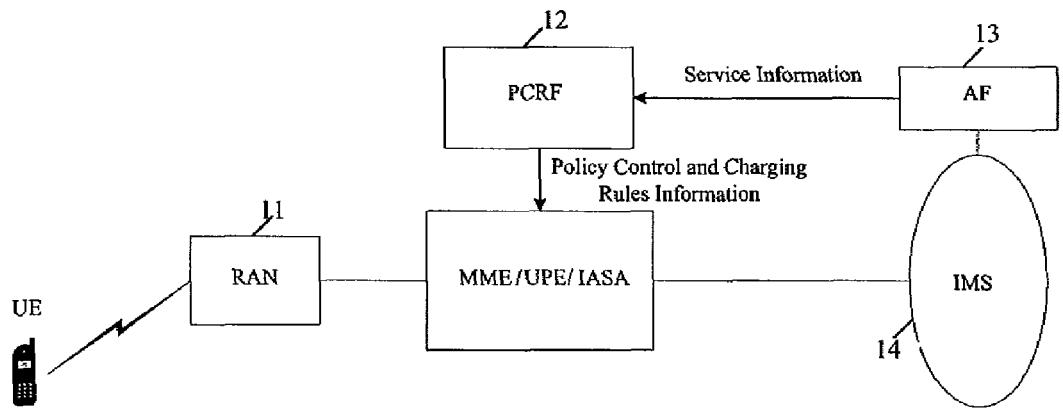
FIG. 1 is a schematic diagram showing the architecture of an SAE network of the prior art in non-roaming scenario.
Figure 2:
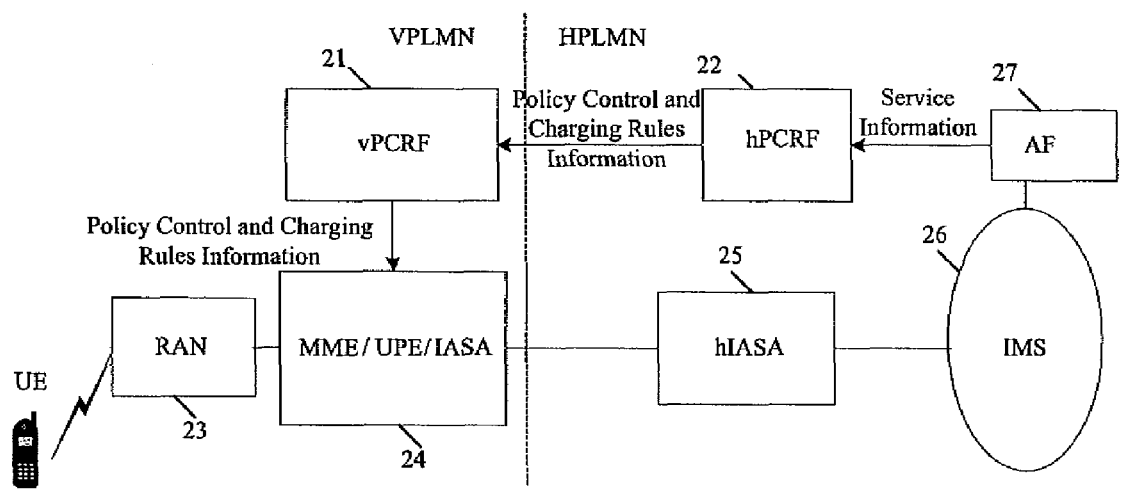
FIG. 2 is a schematic diagram showing the architecture of an SAE network of the prior art in roaming scenario.

Now, the first embodiment of the present invention will be further illustrated by taking the SAE network shown in FIG. 2 as an example.

Figure 4:
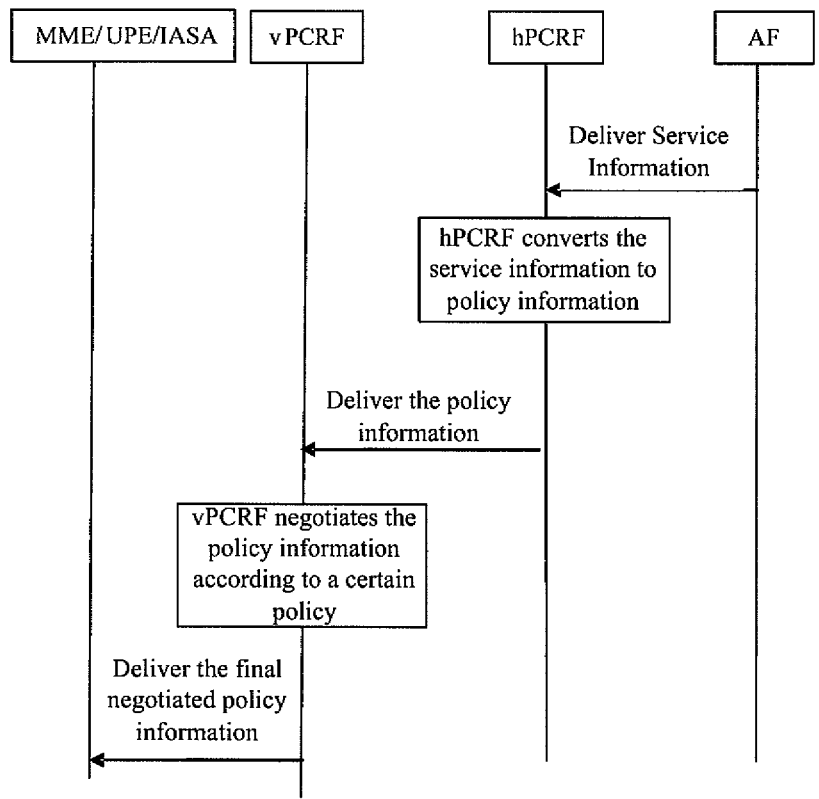
FIG. 4 is a flow chart of an example in an embodiment of the present invention.

When the terminal is in roaming state, the operator of the VPLMN network preconfigures the corresponding policy information of the service, such as QoS information and charging rules, etc., in a vPCRF entity, but the operator of the HPLMN network does not preconfigure the corresponding policy information of the service in hPCRF, instead, converts the service information delivered by the AF into corresponding policy information of the service information, and the policy information of the two operators is different from each other. When the terminal accesses from the VPLMN network and needs to visit the AF service server in the HPLMN network, the process is as shown in FIG. 4.

First of all, when the terminal applies for a service to IMS 26 in the HPLMN network, IMS 26 delivers the service information to hPCRF 22 in current network via AF 27, and hPCRF 22 converts the received service information into corresponding policy information, and obtains the second decision result of the policy information required by the service.

After vPCRF 21 in the VPLMN network receives the policy information represented by the second decision result sent from hPCRF 22, vPCRF 21 makes decision again in conjunction with the first policy information. Specifically, there are three selections as below.

1. The vPCRF 21 completely inherits and accepts the policy information (second decision result) sent from hPCRF 22. This situation occurs when the hPLMN has absolute control power on the service of the terminal and the VPLMN operator accepts the agreement.

For example, in the negotiation policy of QoS, if the second decision result of hPCRF 22 on the QoS negotiation policy required by the service requested by the terminal is that the maximum rate is 300 kbps while the guaranteed rate is 180 kbps, the vPCRF completely inherits and accepts the information sent from hPCRF 22, and delivers the information that the QoS maximum rate is 300 kbps and the guaranteed rate is 180 kbps, to UPE/IASA 24 directly.

2. The vPCRF 21 ignores the policy information (second decision result) sent from hPCRF 22, and continues to use the first policy information preconfigured by itself. This situation occurs when the VPLMN has control power on the service of the terminal and the HPLMN operator also accepts the agreement.

Still taking the negotiation policy of QoS as an example, if the second decision result of hPCRF 22 on the QoS negotiation policy required by the service requested by the terminal is that the maximum rate is 300 kbps while the guaranteed rate is 180 kbps, the vPCRF 21 completely ignores the information sent from hPCRF 22. This situation is used for a specific scenario or for a specific user, thus vPCRF 21 does not need to initiate an update message of QoS.

3. The vPCRF 21 takes the intersection of the policy information (second decision result) sent from hPCRF 22 and the first policy information preconfigured therein. For example, the QoS value may be a value that ensures the lower QoS, while the charging rules may be the intersection. This situation occurs when some agreements are made between the operators of the VPLMN and the HPLMN and the operation features of the two networks are considered synthetically.

Still taking the negotiation policy of QoS as an example, if the decision result of hPCRF 22 on the QoS negotiation policy required by the service requested by the terminal is that the maximum rate is 300 kbps while the guaranteed rate is 180 kbps, the final decision result is that the vPCRF 21 uses the intersection of the maximum rate and the guaranteed rate in the case that the QoS maximum rate preconfigured for such services of the user on vPCRF 21 is 384 kbps and the guaranteed rate is 155 kbps, in other words, the maximum rate is 300 kbps and the guaranteed rate is 155 kbps. Subsequently, the vPCRF 21 will deliver the decision result to the UPE/IASA.

After the above processing, the vPCRF 21 makes final decision on the policy information required by the service requested by the terminal according to the acquired second decision result of hPCRF 22 in the HPLMN network and the internal first policy information, and then the vPCRF delivers the final decision result to the UPE or IASA. The UPE or IASA packages the final decision result into a message, and delivers the message to the MME and the subordinate network elements, and further transfers the message to the terminal via the MME and the subordinate network elements.

The second embodiment of the present invention provides another method for controlling policy information required by a requested service (a service requested by a terminal). The difference between this embodiment and the first embodiment is as follows.

In the second embodiment, preconfigured policy information exists in the PCRF entity in the second network. After the PCRF entity in the second network receives the service information from the AF and converts the service information into the corresponding policy information, the PCRF entity in the second network may further make decision on the policy information required by the service requested by the terminal in conjunction with the policy information preconfigured internally, and generates the second decision result. The decision process of the PCRF entity in the second network is similar to the decision process in Block 103 of the first embodiment, which is as follows:

the PCRF converts the received service information into corresponding policy information, ignores the internal policy information and completely inherits the converted policy information;

or, the PCRF ignores the received service information, makes decision on the policy information required by the service requested by the terminal only according to the internal policy information, and obtains corresponding decision result;

or, the PCRF converts the received service information into corresponding policy information, compares the corresponding policy information with the policy information configured internally, and takes an intersection of the corresponding policy information and the policy information configured internally as the second decision result.

Those skilled in the art may appreciate that all or part of the steps of the above method may be accomplished by instructing the related hardware via programs, and the program may be stored in a storage media, such as ROM/RAM, compact disc and so on.

Figure 5:
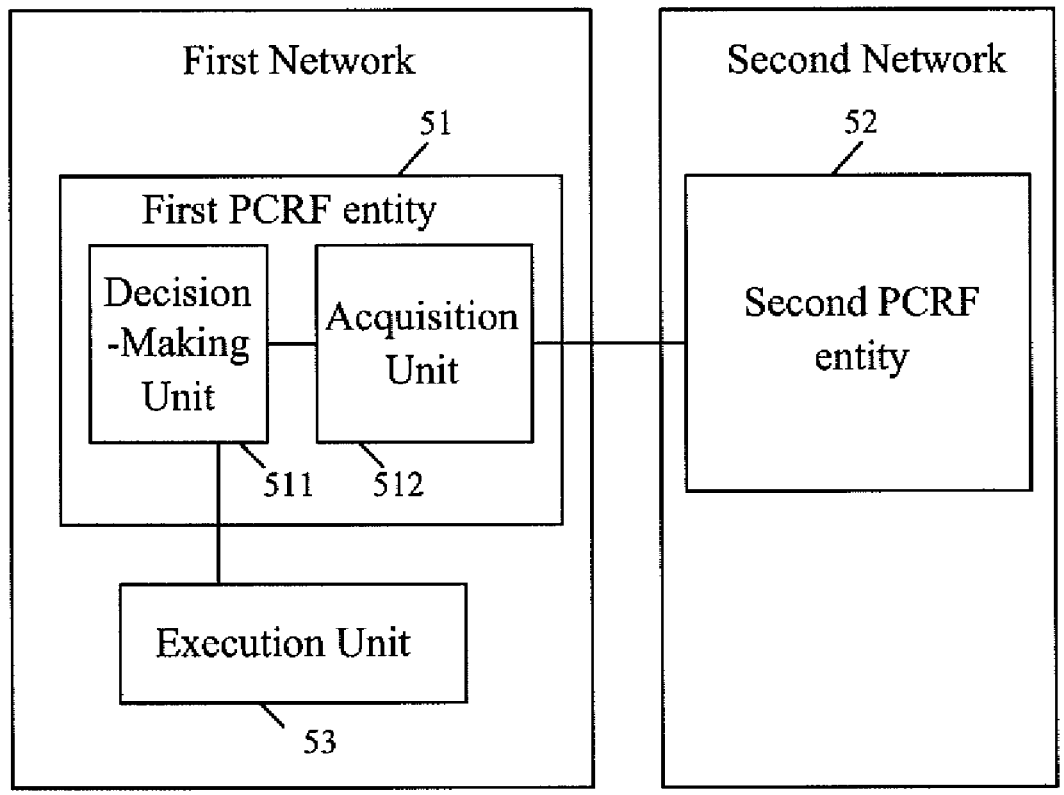
FIG. 5 is a structural diagram of an embodiment of the present invention.

The third embodiment of the present invention provides a system for controlling policy information required by a requested service, the structure of which is as shown in FIG. 5, including: a first PCRF entity 51 in the first network, an execution unit 53 and a second PCRF entity 52 in the second network. The first PCRF entity 51 in the first network includes decision-making unit 511 and acquisition unit 512. The internal structure of the system will now be further illustrated in detail in conjunction with the operating principle of the system.

When a terminal accesses via the first network and needs to visit a service of the second network, the second PCRF entity 52 in the second network makes decision according to the policy information preconfigured internally and the received service information, and obtains the second decision result on the policy information required by the service (this process may be implemented by the fourth decision-making unit in the second PCRF entity 52); or, the second PCRF entity 52 converts the received service information into corresponding policy information, and takes the converted policy information as the second decision result of the second network on the policy information required by the service (this process may be implemented by the fifth decision-making unit in the second PCRF entity 52).

The fourth decision-making unit is applicable for the case in which policy information is preconfigured on the second PCRF entity 52 in the second network. Therefore, after the second PCRF entity 52 receives the service information, the fourth decision-making unit converts the service information into corresponding policy information according to the service information, and makes decision on the policy information required by a service requested by a terminal in conjunction with the policy information preconfigured internally. There are several ways for the fourth decision-making unit to implement the process, which are as follows:

the fourth decision-making unit converts the service information received by the second PCRF entity 52 into corresponding policy information, ignores the internal policy information, and completely inherits the converted policy information, i.e., takes the converted policy information as the second decision result;

or, the fourth decision-making unit ignores the service information received by second PCRF entity 52, makes decision on the policy information required by the service requested by the terminal only according to the internal policy information, and obtains the corresponding decision result (i.e., the second decision result);

or, the fourth decision-making unit converts the service information received by the second PCRF entity 52 into corresponding policy information, compares the corresponding policy information with the policy information configured internally in the second PCRF entity 52, and takes the intersection of the corresponding policy information and the policy information configured internally in the second PCRF entity 52 as the decision result (i.e., the second decision result).

Then, the second PCRF entity 52 in the second network initiatively delivers the second decision result to the first PCRF entity 51 in the first network; or, delivers the second decision result to the first PCRF entity 51 in the first network according to a request from the first PCRF 51 in the first network.

The first PCRF 51 in the first network acquires the second decision result delivered by the second PCRF 52 in the second network via an internal acquisition unit 512, and transfers the second decision result to the decision-making unit 511.

The decision-making unit 511 is used for making decision again according to the second decision result of the second PCRF entity 52 in the second network acquired by the acquisition unit 512 and the first policy information pre-stored internally. Several ways may be adopted to implement the decision-making unit 511.

When the decision-making unit 511 is a first decision-making unit, the decision-making unit 511 ignores the first policy information in the first PCRF entity 51 in the first network, and completely inherits the second decision result acquired from the second network, in other words, the decision-making unit 511 takes the second decision result as the final decision result on the policy information required by the service requested by the terminal.

Or, when the decision-making unit 511 is a second decision-making unit, the decision-making unit 511 ignores the second decision result acquired from the second network, makes decision on the policy information required by the service requested by the terminal according to the first policy information therein, and takes the obtained corresponding decision result as the final decision result on the policy information required by the service.

Optionally, when the decision-making unit 511 is a third decision-making unit, the decision-making unit 511 compares the second decision result acquired from the second PCRF entity 52 in the second network with the first policy information configured in the first PCRF entity 51 in the first network, and takes an intersection as the final decision result.

After the decision-making unit 511 makes the final decision result on the policy information required by the service requested by the terminal (which is a requested service viewed from the network), the decision-making unit 511 sends the decision result to the execution unit 53, and the execution unit 53 executes the service requested by the terminal according to the decision result. Herein, the execution unit may be UPE, IASA or MME.

Figure 6:
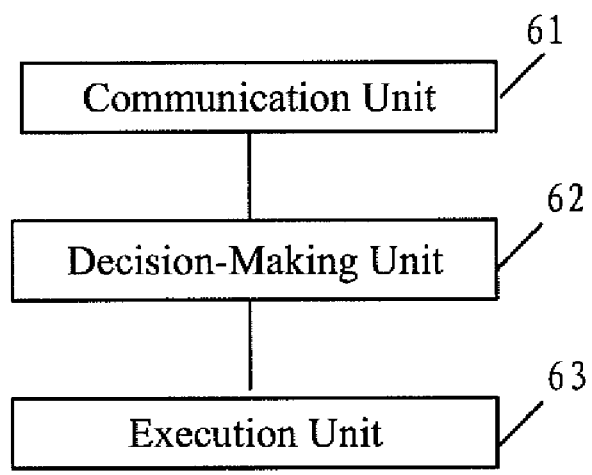
FIG. 6 is a structural diagram of a device for controlling policy information required by a requested service according to an embodiment of the present invention.

Another embodiment of the present invention further discloses a device for controlling policy information required by a requested service. FIG. 6 is a structural diagram of a device for controlling policy information required by a requested service according to the embodiment of the present invention. The device of this embodiment includes communication unit 61 and decision-making unit 62, and may also include execution unit 63. The internal structure of the device will now be further illustrated in conjunction with the operating principle of the device. Specifically, the device for controlling policy information required by a requested service of this embodiment may be a device containing PCRF entity.

First of all, the device of this embodiment obtains the second decision result of the second network on policy information required by a requested service via the communication unit 61. Specifically, the communication unit 61 may perform an acquisition process initiatively, in other words, the communication unit 61 sends a request to corresponding device in the second network, and then receives the second decision result delivered by corresponding device in the second network. Optionally, the communication unit 61 may receive the second decision result passively, in other words, the corresponding device in the second network initiatively delivers the second decision result to the communication unit 61, so that the communication unit 61 may obtain the second decision result.

Subsequently, the decision-making unit 62 makes decision on the policy information required by the requested service according to the first policy information in the first network and the second decision result provided by the communication unit 61, and makes a final decision result on the policy information required by the requested service. Generally speaking, the device is a device in the first network, with the first policy information configured internally. Moreover, the requested service is usually a service requested by a user in roaming state, the first network is the visited network of the user, and the second network is the home network of the user.

There are many ways to implement the decision-making unit 62. Specifically, the decision-making unit 62 may be the first decision-making unit for ignoring the first policy information in the first network, completely inheriting the second decision result provided by the communication unit 61, and taking the second decision result as the final decision result on the policy information required by the requested service. Also, the decision-making unit 62 may be the second decision-making unit for ignoring the second decision result provided by the communication unit 61, making decision on the policy information required by the requested service only according to an internal first policy information, and generating corresponding final decision result. In addition, the decision-making unit 62 may also be the third decision-making unit for comparing the second decision result with the internal first policy information and taking the intersection of the second decision result and the internal first policy information as the final decision result on the policy information required by the requested service.

Furthermore, the device may also include execution unit 63 for executing the policy information required by the requested service according to the final decision result provided by decision-making unit 62.

As shown in above description, according to embodiments of the present invention, when a terminal accesses from a VPLMN network and needs to visit a service of the HPLMN, a vPCRF entity in the VPLMN network processes the preconfigured policy information and obtains related policy information from an hPCRF in the HPLMN network depending on the policy between the two operators, so that the interactive processing between PCRF entities may be implemented among different networks.

While the present invention has been illustrated and described with reference to some preferred embodiments, the present invention is not limited to these. Those skilled in the art should recognize that various variations and modifications can be made without departing from the spirit and scope of the present invention as defined by the accompanying claims.

The invention claimed is:

1. A method for controlling policy information required by a requested service, comprising:
    obtaining, by a first Policy Control and Charging Rules Function (PCRF), in a first network, a second decision result of a second network on the policy information required by the requested service from a second PCRF in the second network; and
    making, by the first PCRF, a decision on the policy information required by the requested service according to first policy information in the first network and the second decision result, and generating a decision result on the policy information required by the requested service.

2. The method according to claim 1, wherein the obtaining the second decision result of the second network on the policy information required by the requested service comprises:
    receiving the second decision result of the second network on the policy information required by the requested service is initiatively delivered by the second network;
    or, requesting the second network to deliver the second decision result of the second network on the policy information required by the requested service.

3. The method according to claim 1, wherein the making the decision on the policy information required by the requested service according to the first policy information in the first network and the second decision result and generating the final decision result on the policy information required by the requested service comprises:
    ignoring the first policy information in the first network and completely inheriting the second decision result, and taking the second decision result as the final decision result on the policy information required by the requested service;
    or,
    ignoring the second decision result, making decision on the policy information required by the requested service only according to the first policy information in the first network, and generating corresponding final decision result;
    or,
    comparing the second decision result with the first policy information in the first network, and taking an intersection of the second decision result and the first policy information as the final decision result on the policy information required by the requested service.

4. The method according to claim 1, wherein the generating the second decision result comprises:
    a third function entity in the second network receiving a service request from a user and delivering a requested service information to a second PCRF in the network;
    the second PCRF making decision according to an internal policy information and the received service information, and generating the second decision result on the policy information required by the requested service; or, the second PCRF converting the received service information into corresponding policy information, and generating the second decision result on the policy information required by the service.

5. The method according to claim 4, wherein the process in which the second PCRF makes decision according to the internal policy information and the received service information and generates the second decision result on the policy information required by the service comprises:
    the second PCRF converting the received service information to corresponding policy information, ignoring the internal policy information, and taking the converted policy information as the second decision result on the policy information required by the requested service;
    or,
    the second PCRF ignoring the received service information, making decision on the policy information required by the requested service only according to the internal policy information, and generating the second decision result on the policy information required by the requested service;
    or,
    the second PCRF converting the received service information into corresponding policy information, comparing the converted policy information with the internal policy information, and taking an intersection of the converted policy information and the internal policy information as the second decision result on the requested service.

6. The method according to claim 1, wherein the requested service is a service requested by a terminal in roaming state, the first network is a visited network of the terminal, and the second network is a home network of the terminal.

7. The method according to claim 1, wherein the requested service is the second network service requested by a terminal accessing via the first network.

8. A device for controlling policy information required by a requested service, wherein the device is a first Policy Control and Charging Rules Function (PCRF) in a first network, comprising:
   a communication unit, adapted to obtain a second decision result of a second network on the policy information required by the requested service from a second PCRF in the second network; and
   a decision-making unit, adapted to make decision on the policy information required by the requested service according to first policy information in the first network and the second decision result provided by the communication unit, and generate a final decision result on the policy information required by the requested service.

9. The device according to claim 8, wherein:
   the decision-making unit is a first decision-making unit and is adapted to ignore the first policy information in the first network, completely inherit the second decision result provided by the communication unit, and take the second decision result as the final decision result on the policy information required by the requested service;
   or,
   the decision-making unit is a second decision-making unit and is adapted to ignore the second decision result provided by the communication unit, make decision on the policy information required by the requested service according to the first policy information in the first network, and generate corresponding final decision result;
   or,
   the decision-making unit is a third decision-making unit and is adapted to compare the second decision result with the first policy information in the first network, and take an intersection of the second decision result and the first policy information in the first network as the final decision result on the policy information required by the requested service.

10. The device according to claim 8, wherein the requested service is a service requested by a terminal in roaming state, the first network is a visited network of the terminal, and the second network is a home network of the terminal.

11. The device according to claim 10, wherein the requested service is the second network service requested by a terminal accessing via the first network.

12. A system for controlling policy information required by a requested service, comprising:
   a second Policy Control and Charging Rules Function (PCRF) in a second network, adapted to generate a second decision result of the second network on the policy information required by the requested service;
   a first PCRF in a first network, adapted to make decision on the requested service according to first policy information and the second decision result provided by the second PCRF, and obtain a final decision result on the requested service.

13. The system according to claim 12, wherein the system further comprises:
   an execution unit in the first network, adapted to execute the policy information required by the requested service according to the final decision result provided by the first PCRF.

14. The system according to claim 12, wherein the first PCRF comprises:
   an acquisition unit, adapted to acquire the second decision result of the second network on the policy information required by the requested service according to the information delivered by the second PCRF; and
   a decision-making unit, adapted to make decision on the policy information required by the requested service according to the internal first policy information and the second decision result provided by the acquisition unit, and generate a final decision result on the policy information required by the requested service.

15. The system according to claim 14, wherein:
   the decision-making unit is a first decision-making unit and is adapted to ignore the internal first policy information, completely inherit the second decision result, and take the second decision result as the final decision result on the policy information required by the requested service;
   or,
   the decision-making unit is a second decision-making unit and is adapted to ignore the second decision result, make decision on the policy information required by the requested service according to the internal first policy information, and generate corresponding final decision result;
   or,
   the decision-making unit is a third decision-making unit and is adapted to compare the second decision result with the first policy information in the first PCRF, and take an intersection of the second decision result and the first policy information in the first PCRF as the final decision result on the requested service.

16. The system according to claim 12, wherein:
   the second PCRF comprises a fourth decision-making unit and is adapted to make decision according to the policy information preconfigured internally and the received service information of the requested service, and generate the second decision result on the policy information required by the requested service;
   or,
   the second PCRF comprises a fifth decision-making unit and is adapted to convert the received service information of the requested service to corresponding policy information, and take the converted policy information as the second decision result on the policy information required by the requested service.

17. The system according to claim 12, wherein the requested service is a service requested by a terminal in roaming state, the first network is a visited network of the terminal, and the second network is a home network of the terminal.

18. The system according to claim 12, wherein the requested service is a second network service requested by a terminal accessing via the first network.

* * * * *